(12) United States Patent
Christ et al.

(10) Patent No.: US 10,604,177 B2
(45) Date of Patent: Mar. 31, 2020

(54) STEERING DEVICE, CONSTRUCTION MACHINE WITH A STEERING DEVICE AND METHOD FOR STEERING A STEERABLE MACHINE

(71) Applicant: BOMAG GMBH, Boppard (DE)

(72) Inventors: Hermann Christ, Bubach (DE); Andreas Berenz, Buechel (DE)

(73) Assignee: BOMAG GMBH, Boppard (DE)

( * ) Notice: Subject to any disclaimer, the term of this patent is extended or adjusted under 35 U.S.C. 154(b) by 0 days.

(21) Appl. No.: 15/444,551

(22) Filed: Feb. 28, 2017

(65) Prior Publication Data

US 2017/0247049 A1    Aug. 31, 2017

(30) Foreign Application Priority Data

Feb. 29, 2016 (DE) .......................... 10 2016 002 443

(51) Int. Cl.
| | |
|---|---|
| *B62D 5/06* | (2006.01) |
| *B62D 5/093* | (2006.01) |
| *B62D 1/18* | (2006.01) |
| *B62D 5/10* | (2006.01) |
| *B62D 12/00* | (2006.01) |

(52) U.S. Cl.
CPC .............. *B62D 5/062* (2013.01); *B62D 1/18* (2013.01); *B62D 5/06* (2013.01); *B62D 5/063* (2013.01); *B62D 5/093* (2013.01); *B62D 5/10* (2013.01); *B62D 12/00* (2013.01); *B60Y 2200/41* (2013.01)

(58) Field of Classification Search
CPC .......... B62D 5/062; B62D 5/06; B62D 5/063; B62D 5/093; B62D 12/00
See application file for complete search history.

(56) References Cited

U.S. PATENT DOCUMENTS

| | | | | |
|---|---|---|---|---|
| 3,564,848 A | * | 2/1971 | Baatrup et al. ........ | B62D 5/097 180/405 |
| 3,735,818 A | * | 5/1973 | Swisher, Jr. ........... | B62D 53/02 172/119 |

(Continued)

FOREIGN PATENT DOCUMENTS

| | | |
|---|---|---|
| DE | 1755387 | 1/1972 |
| EP | 2045168 | 4/2009 |
| GB | 2315472 | 2/1998 |

OTHER PUBLICATIONS

Search Report from EPO Appln. No. 17000311.5, dated Oct. 30, 2017.

*Primary Examiner* — Joseph M Rocca
*Assistant Examiner* — Michael R Stabley
(74) *Attorney, Agent, or Firm* — Grossman, Tucker, Perreault & Pfleger, PLLC (57) ABSTRACT

A steering device for a steerable machine, particularly a construction machine, comprising a steering element for manual input of steering commands, a steering actuator for driving a steering adjustment of a travel unit of the construction machine, and a transmission device, which is arranged between the steering element and the steering actuator, the transmission device including an actuator orbitrol for driving the steering actuator. Furthermore, the invention relates to a construction machine having such a steering device, as well as to a method for steering a steerable machine, particularly a construction machine.

21 Claims, 4 Drawing Sheets

(56) References Cited

U.S. PATENT DOCUMENTS

| | | | | |
|---|---|---|---|---|
| 3,995,569 A * | 12/1976 | Picardat | A01B 45/00 | 111/12 |
| 4,548,035 A * | 10/1985 | Thomsen | B62D 5/09 | 60/384 |
| 6,688,450 B2 * | 2/2004 | Speers | B65G 41/005 | 198/303 |
| 6,926,113 B2 * | 8/2005 | Hennemann | B62D 5/061 | 180/417 |
| 7,617,905 B2 * | 11/2009 | Binev | B62D 6/02 | 180/403 |
| 7,677,351 B2 * | 3/2010 | Biener | B62D 5/093 | 180/404 |
| 7,712,574 B2 * | 5/2010 | Hublart | B62D 1/16 | 180/441 |
| 7,753,455 B2 * | 7/2010 | Binev | B60T 13/22 | 303/11 |
| 8,695,333 B2 * | 4/2014 | Vigholm | E02F 9/2217 | 60/461 |
| 8,869,520 B2 * | 10/2014 | Vigholm | E02F 9/2228 | 60/422 |
| 8,930,082 B2 * | 1/2015 | Keller | B62D 7/026 | 180/402 |
| 9,074,347 B2 * | 7/2015 | Vigholm | E02F 9/2217 | |
| 2004/0144590 A1 * | 7/2004 | Fluent | B60N 2/14 | 180/326 |
| 2010/0268410 A1 * | 10/2010 | Vigholm | E02F 9/2217 | 701/31.4 |
| 2012/0048639 A1 | 3/2012 | Haubrich et al. | | |
| 2015/0021116 A1 * | 1/2015 | Young | B62D 5/093 | 180/406 |
| 2016/0002886 A1 * | 1/2016 | Vigholm | F15B 13/0433 | 60/327 |
| 2018/0186402 A1 * | 7/2018 | Irie | B62D 5/065 | |

* cited by examiner

STEERING DEVICE, CONSTRUCTION MACHINE WITH A STEERING DEVICE AND METHOD FOR STEERING A STEERABLE MACHINE

The invention relates to a steering device, comprising a steering element for the manual input of steering commands, a steering actuator for driving a steering adjustment of a steering apparatus of a chassis of the construction machine, and a transmission device arranged between the steering element and the steering actuator, the transmission device including an actuator orbitrol for driving the steering actuator. The invention also relates to a construction machine with a steering device as well as a method for steering a steerable machine, particularly a construction machine.

When operating mobile work machines, particularly construction machines, the design of the steering device is of major importance, for example, to enable precise and reliable maneuvering of the mobile work machine. Typical steering systems, which frequently appear here, are, for example, Ackermann steering systems, articulated steering systems or pivot steering systems. The steering movements are typically entered by the operator of the construction machine via a steering element for manual input of steering commands. This may be, for example, a steering wheel or a steering lever, which is arranged in or on an operator's platform of the steerable machine. The present invention related to the transmission of steering commands from the manual steering input point (steering element) to the steered chassis component, for example, wheels or an articulated joint.

In this connection, it is known, for example, to use purely mechanical, electrical or electro-hydraulic transmission devices. When designing these systems, multiple aspects must simultaneously be considered. In addition to the ubiquitous requirement of developing the most cost-efficient and functional systems possible, steering systems pose the special challenge of directing commands from the input point of the steering system to the steered chassis component in a precise manner. At the same time, a force feedback is desired in order to provide the operator with information regarding the situation during the steering process.

For these reasons, it is already known to use an actuator orbitrol for this type of steering device, which is driven by a steering axle or a steering axle in conjunction with a gearbox. In the present case, an actuator orbitrol refers to a component, which is, for example, an orbitrol used for driving the adjustment of a steering actuator. The steering actuator is ultimately a drive element, which drives the adjusting movement of the travel units to be steered, for example, wheels. This may particularly be, for example, a hydraulic cylinder, especially a double-acting hydraulic cylinder, or a hydraulic motor. The benefit of using an actuator orbitrol is especially the fact that the actuator orbitrol enables a mechanical-hydraulic enhancement towards the steering actuator, such that the steering forces to be applied on the steering element can ultimately be reduced. Thus, overall the orbitrol represents a mechanical-hydraulic enhancement device in the present case. Here, an orbitrol thus refers in particular to an actuator unit comprising a steering valve (usually a rotary slide valve) and a dispensing unit/a displacer (for example, toothed ring machine, especially in the form of a gerotor machine or an orbital machine) and a connection to an external hydraulic pressure source, for example, a pump or a pressure accumulator, in which, in response to an inlet-side rotating movement, external hydraulic energy is supplied by the steering valve to the dispensing unit, which, as a result, is set into rotation. Due to a mechanical connection of the dispensing unit with the steering valve, e.g. a rotary slide valve, the rotating movement continues until the valve interrupts the external hydraulic energy.

The design of the steering device often poses problems particularly in construction machines. Due to the specific requirements for the operation of construction machines, they often have operator platforms with an adjustable operator workstation. This sets special demands on the design of the steering device because it is necessary to ensure that reliable steering inputs can occur via the steering element from the respective positions of the operator workstation and a precise transfer of the steering inputs to the steering actuator is guaranteed. Construction machines for which these types of operator workstations are frequently used, are, in particular, rollers, especially rubber wheel rollers or tandem rollers with articulated or pivoted steering, wheel road pavers, and road milling machines. In addition to shifting adjustments, particularly transversally to the working direction of the construction machine, rotating movements of the operator workstation are frequently desirable, for which the operator workstation—ideally together with the steering element—is rotated about a vertical axis of rotation. This often serves to improve the visibility conditions and/or to enhance the comfort for the operator of the construction machine during the work process. This type of solution is described, for example, in DE102010035270A1. Said document discloses a solution involving displacement of the operator workstation transversely to the forward direction from a right position to a left position and/or a middle position in order to accommodate, for example, to specific characteristics of the construction site. The interface within the transmission device for transferring the steering commands between the moveable operator workstation and the rest of the machine is enabled via a respective mechanism.

Against the background of this prior art, the object of the invention is now to further optimise a generic steering device and, in particular, to further adapt to the specific operator platform needs of construction machines.

The object is achieved with a steering device for a steerable machine, a construction machine, as well as a method for steering a steerable machine according to the independent claims. Preferred embodiments are specified in the dependent claims.

An important basic idea of the invention lies within the fact that an upstream orbitrol is provided in addition to the actuator orbitrol, the upstream orbitrol being arranged between the steering element and the actuator orbitrol in such a manner that, on the one hand, it is driven by the steering element and, on the other hand, it drives the actuator orbitrol at least indirectly. As a result, there are two orbitrols arranged in series from the steering element to the steering actuator. The upstream orbitrol thus acts as the drive unit for the adjusting movement for the actuator orbitrol. As a result, a functional series arrangement of two successive enhancement elements (orbitrols) is achieved, through which, on the one hand, only a minimum force needs to be manually applied by the operator on the steering element due to the enhancing functionality of the upstream orbitrol. On the other hand, in contrast, for example, to a steer-by-wire solution, a closed energy transfer chain from the steering element to the steering actuator and back to the steering element is maintained, so that relevant information regarding driving situations is returned to the operator. This relates in particular to the reaching of the maximum steering angle as well as a torque increase caused by the rotation speed of the steering element and the associated oil quantity supplied by the actuator orbitrol exceeding the auxiliary energy provided by the pump as an oil quantity (so-called "catch the pump" effect). Thus, the upstream orbitrol functions as a type of pilot stage between the steering wheel and the actuator orbitrol.

The upstream orbitrol is preferably operatively connected to the actuator orbitrol via a closed hydraulic circuit or a hydrostat. In this context, operatively connected means that the hydraulic fluid flow triggered through the operation of the upstream orbitrol is used to adjust the actuator orbitrol for actuating the steering actuator. This is achieved particularly well if a hydraulic motor is present for driving the actuator orbitrol through the upstream orbitrol, which communicates with the upstream orbitrol by means of hydraulic lines, and which has a movement transmission device on the output side, particularly a shaft or a gearbox, towards the actuator orbitrol. Thus, in terms of effect, the upstream orbitrol represents a pump and the hydraulic motor represents the load in the closed hydraulic circuit.

In addition, a device for pressure pre-tensioning is preferably provided as a component of the closed hydraulic circuit. Said device for pressure pre-tensioning may comprise, in particular, pressure relief valves and/or check valves, which are arranged in mutually counteracting pairs between two line connections to the hydraulic motor.

The pressure pre-tensioning device is preferably supplied with hydraulic fluid via a pump, particularly a steering pump. This pump may involve in particular a fixed displacement pump or a regulated variable displacement pump. The specific connection of the pump to the closed hydraulic circuit can likewise vary.

The hydraulic fluid supply of the upstream orbitrol and the actuator orbitrol can vary as well. In particular, it is possible to supply the upstream orbitrol as well as the actuator orbitrol through a common pump. However, it may be preferable if the upstream orbitrol and the actuator orbitrol are supplied by separate pumps or steering pumps. In this case, therefore, at least two pumps are present, each of the two pumps respectively supplying either the upstream orbitrol or the actuator orbitrol (in addition to possible further loads).

The nominal diameters of connecting lines from the actuator orbitrol to the steering actuator are preferably greater than the nominal diameters of connecting lines in the closed hydraulic circuit between the upstream orbitrol and actuator orbitrol, or a hydraulic motor driving the actuator orbitrol, by at least the factor of 1.5, particularly by at least the factor of 2, and more particularly by at least the factor of 3. Exemplary nominal diameters may be 6 mm for the hydraulic connecting lines between the upstream orbitrol and the actuator orbitrol, or the motor powering the actuator orbitrol, and 12 mm for the hydraulic connecting lines between the actuator orbitrol and the steering actuator. Thus, relatively small nominal diameters and, therefore, less expensive hose connections can be used for comparatively large transmission distances, whereas at those locations where large forces/torques must be transferred—specifically in the power section between the actuator orbitrol and steering actuator—the routes can be kept short and, thus, the material usage of costly hydraulic hoses with large nominal diameters can be kept at a minimum.

Regardless of this, hydraulic hoses of the so-called "light series" are preferably used for the hydraulic hoses for transmitting between the upstream orbitrol to the actuator orbitrol, or the element powering it, and hydraulic hoses of the so-called "heavy-duty series" are preferably used for the line connections between the actuator orbitrol and the steering actuator. Reference is made to DIN 20066:2012-01 for the meaning and definition of the terms "light series" (L-series) and "heavy-duty series" (HD-series). Hydraulic hoses of the "light series" are generally more cost-efficient, whereas hydraulic hoses of the "heavy-duty series" are more pressure-resistant.

The advantages of the invention emerge particularly clearly if a fixed arrangement of the entire steering device on the steerable machine is not possible, as is the case, for example, with adjustable operator platforms or operator workstations. Then it is possible to dispense with relatively sophisticated and costly mechanical or electrical transmission solutions. Due to the fact that the upstream orbitrol is in signal connection with the actuator orbitrol via hydraulic lines, these hydraulic lines can be simply carried along upon adjusting the operator platform or the operator workstation relative to the machine frame because of their flexible properties without further adaptation of the steering devices being necessary for this. This is ensured in particular through the use of "light series" hoses according to the invention. This is achieved especially well if the upstream orbitrol forms an interrelated constructional unit with the steering element. An interrelated construcional unit specifically means a unit which together forms an independent module operating as a whole. In particular, this simplifies the installation of the steering device according to the invention.

The advantages of the steering device according to the invention emerge very clearly in a construction machine, especially a road construction machine. Therefore, the object of the invention is also a construction machine, particularly a road construction machine, with a steering device according to the invention. In this regard, particularly construction machines of the roller type—especially tandem rollers, road milling machines, particularly large milling machines of the mid-mounted engine type or small milling machines, wheeled road pavers, stabilizers, and/or recyclers as well as rubber wheeled rollers with articulated or pivot steering—are conceivable in the present case.

The construction machine according to the invention particularly preferably comprises an operator platform, which is adjustable at least partly between two alternative operating positions in relation to a current operating position. The operator platform designates that part of the construction machine on or in which a user of the construction machine is located during the work process and from where he gives the steering and drive commands. Depending on the specific work situation, the operator may wish to have alternative operating positions within the operator platform. To ensure that he can still reliably control the construction machine from these different positions, elements of the operator platform, particularly the steering element and/or a unit comprising a driver's seat, are adjustably designed. It is also possible to design the steering element and the driver's seat as a commonly adjustable unit, for example, via a suitable, adjustable platform, a sliding carriage, etc. These solutions are principally known in the prior art. The steering device according to the invention is particularly suitable for use in a construction machine with an adjustable operator platform, in which at least the steering element is adjustable and, in particular, displaceable—especially in conjunction with a driver's seat—transversely to the construction machine's working direction. Because the hydraulic transmission connection between the upstream orbitrol and the actuator orbitrol comprises flexible hydraulic lines, it is possible to dispense with complex measures of adapting the steering device to the different positions of the steering element, particularly if the upstream orbitrol is carried along with the steering element, for example, in the case of a common modular design. Adjusting movements of the steering element or the upstream orbitrol with respect to the actuator orbitrol are compensated through the flexible hydraulic lines or at least flexible sections of the hydraulic lines. Additionally or alternatively, the steering element may also be designed such that it can be swiveled about a vertical axis. The steering element can additionally be a part of a control platform or a control slide, which in particular comprises a driver's seat. Thus, to provide the at least two alternative operating positions, the control slide or control platform may be adjustable between at least the two operating positions together with the steering element as a unit, particularly capable of being swiveled transversely to the construction machine's working direction and/or about a vertical axis. In this case as well, the adjusting movements of the steering element may be compensated through the flexible hydraulic lines or at least flexible subsections of the hydraulic lines between the upstream orbitrol and the actuator orbitrol or the drive unit of the actuator orbitrol. Thus, it is possible to ensure in a comparatively easy manner that a reliable transfer of the steering commands entered through the steering element occurs via the upstream orbitrol to the actuator orbitrol from the various operating positions of the steering element without complex structural adaptation measures being necessary.

The upstream orbitrol is preferably integrated into the control platform or the control slide and is thus carried along during adjustment of the control platform or the control slide.

In contrast, the actuator orbitrol is preferably arranged outside the operator platform, particularly stationary in its relative position to the drive engine of the construction machine, and/or in the engine compartment and/or on the machine frame.

The pump of the upstream orbitrol and/or the actuator orbitrol is preferably driven by a pump transfer gear or a power take-off of the drive motor.

Finally, in another aspect, the invention relates to a method for steering a steerable machine, particularly a construction machine according to the invention, with a steering device, particularly a steering device according to the invention. An essential aspect of the method according to the invention is the interaction of the two orbitrols—the "upstream orbitrol" and the "actuator orbitrol"—arranged in series between the steering element and the steering actuator. Through the manual steering input via the steering element, the manual steering input signal is initially received, enhanced, and transferred by the upstream orbitrol. The actuator orbitrol is at least indirectly driven, for example, via a suitable hydraulic motor, by the hydraulic fluid flow supplied by the displacer of the upstream orbitrol in the closed circuit. The actuator orbitrol in turn drives the adjustment of the steering actuator, particularly in a once again enhanced manner or actuating power. The method according to the present invention thus enables a particularly efficient implementation of the manual input of steering commands occurring via the steering element to the adjusting movement of the steering actuator, wherein particularly a stepwise enhancement of the actuating power is possible and desirable from the steering element to the steering actuator. At the same time, however, the possibility of tangible force feedback is maintained.

Below, the invention is illustrated in further detail with reference to the exemplary embodiments shown in the figures. In the schematic figures.

Like components are designated by like reference signs in the figures, however reference signs of recurring components may be omitted in some figures.

FIGS. 1 to 6 initially illustrate different construction machines 1 having a steering device according to the invention (not depicted in FIGS. 1 to 6). All construction machines 1 comprise travel units 2, which are steerable via at least one steering actuator (not shown in FIGS. 1 to 6). Furthermore, an operator platform 3 is respectively provided, from which the construction machine 1 is operated. The work direction is respectively indicated by the arrow A. All construction machines 1 shown in FIGS. 1 to 6 comprise a drive engine, which provides the drive power necessary for operation, and are self-propelled.

Figures 1, 2, 3, 4, 5, 6:
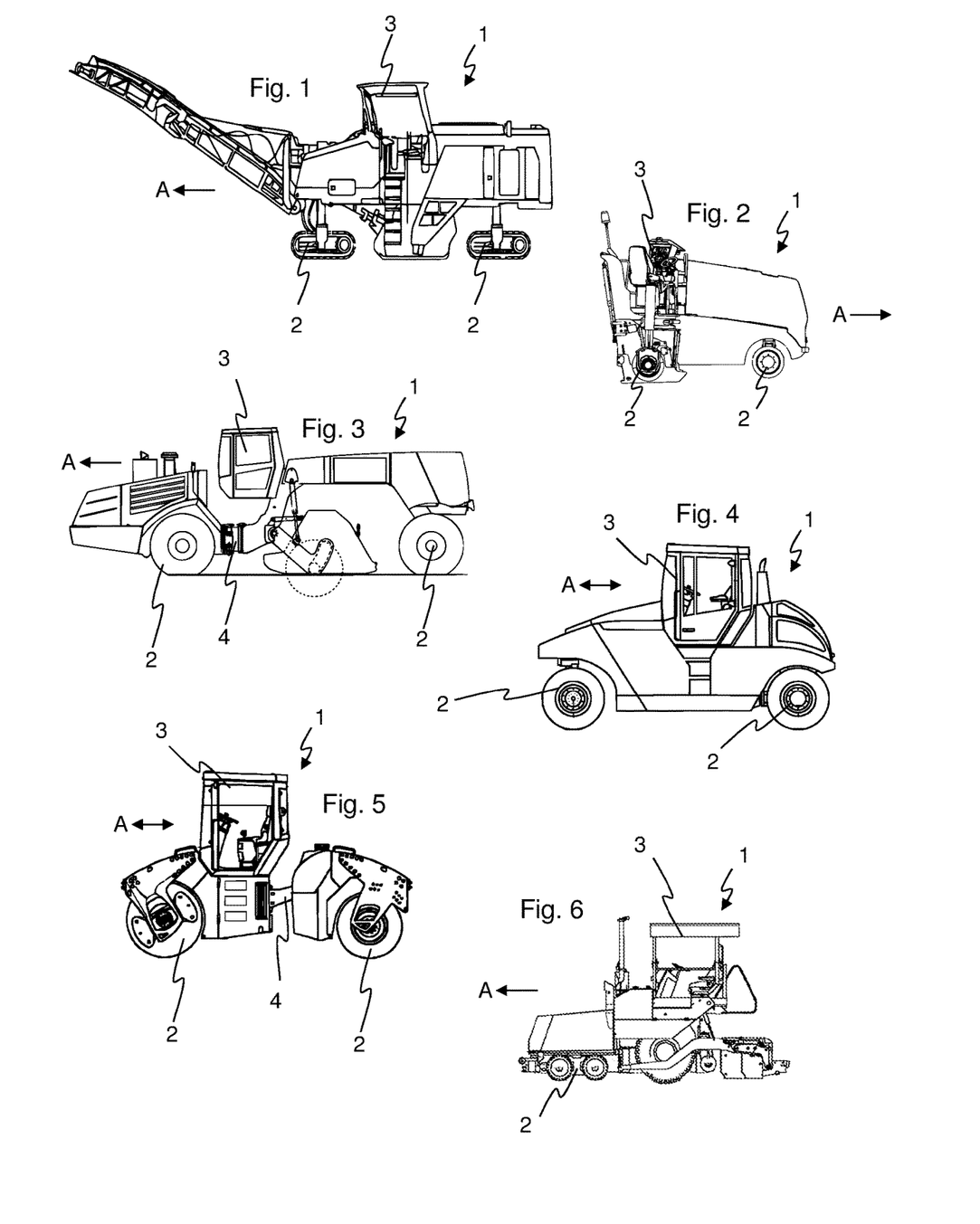
FIG. 1: is a side view of a large milling machine.
FIG. 2: is a side view of a compact milling machine.
FIG. 3: is a side view of a stabilizer/recycler.
FIG. 4: is a side view of a rubber wheeled roller.
FIG. 5: is a side view of a tandem roller with articulated steering.
FIG. 6: is a side view of a wheeled road paver.

FIG. 1 shows specifically a road milling machine of the large milling machine type. The travel units 2 are crawler tracks, which are connected to the machine frame via lifting columns. In the case of this machine type, the front as well as the rear travel units 2 are steerable.

FIG. 2 illustrates a compact or small milling machine having an open operator platform 3. In this case, the front wheels are likewise steerable, although machines that also permit steering of at least one of the rear wheels are known as well.

FIG. 3 shows a stabilizer/recycler. Steering occurs via an articulated steering system 4 between the front and rear part of the stabilizer/recycler. Furthermore, the rear set of wheels is likewise steerable, for example, via an Ackermann steering system.

In the case of the rubber-wheeled roller of FIG. 4, the front and/or rear travel units 2 are steerable. During operation, the rubber-wheeled roller moves in the forward and backward direction in an alternating manner.

In the case of the tandem roller shown in FIG. 5, steering occurs via an articulated joint arranged between the front carriage and the rear carriage. Alternatively, a respective pivot steering system may be provided for the front and rear travel units instead of an articulated steering system.

Finally, in the case of the road paver shown in FIG. 6, the two wheels attached to a tandem axle are steerable via a steering actuator.

Naturally, multiple steering actuators may be present in the machines mentioned above, which, however, are normally collectively controlled by the steering element.

Figure 7:
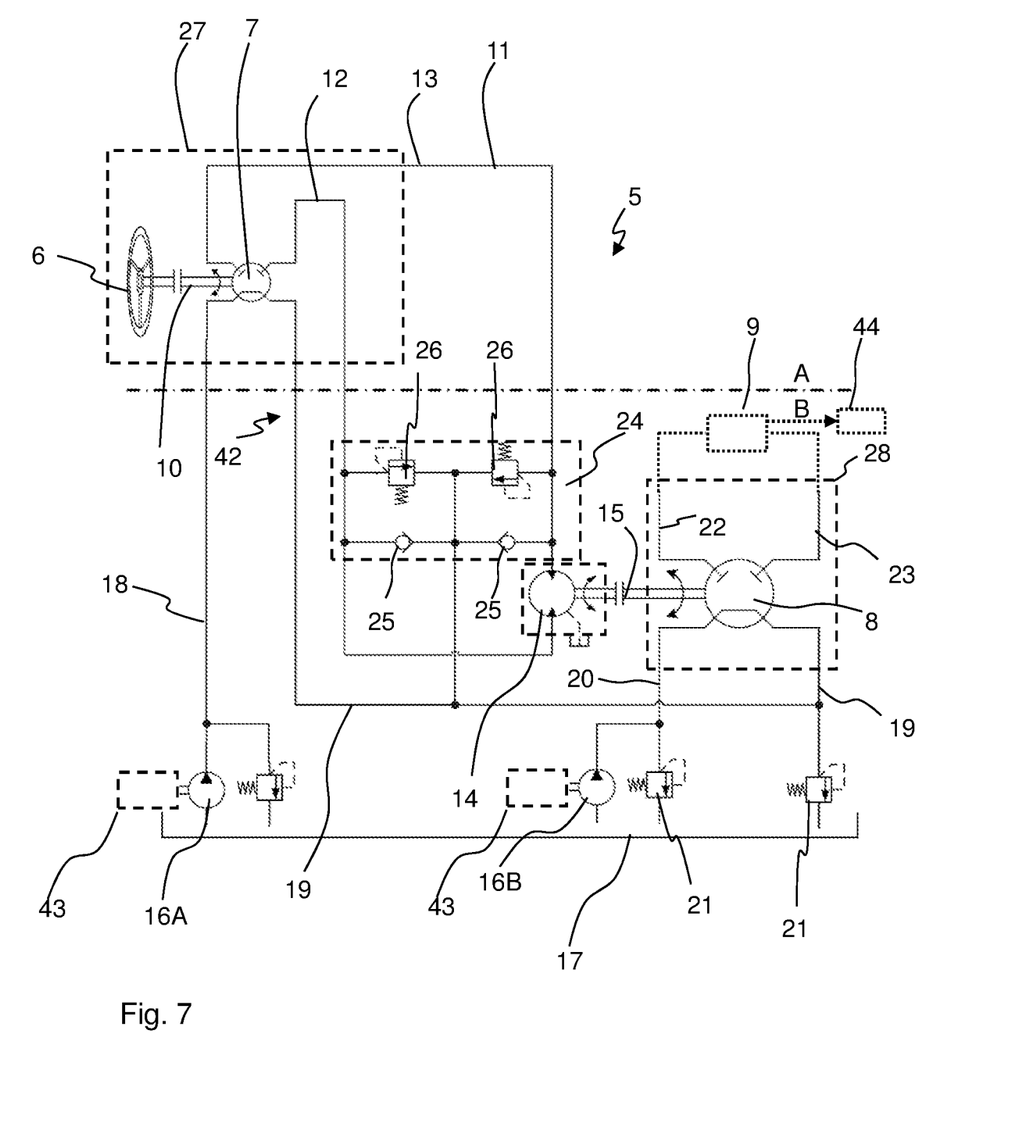
FIG. 7: is a schematic diagram of a steering device of a first exemplary embodiment.

FIG. 7 illustrates the general design of a steering device 5 according to the invention. Essential elements of the steering device 5 are a steering element 6, specifically a steering wheel in the present exemplary embodiment, an upstream obritrol 7, an actuator orbitrol 8, as well as a steering actuator 9. The steering actuator 9 is, for example, a hydraulic cylinder, which drives the adjustment of a steering apparatus 44, for example, an articulated joint, an Ackermann steering system or a turning/pivot steering system. In this connection, FIG. 7 illustrates that the upstream orbitrol 7, the actuator orbitrol 8, and the steering actuator 9 are arranged in series coming from steering element 6. Thus, the upstream orbitrol 7, the actuator orbitrol 8, and the interconnected hydraulic system form an enhancing transmission device 42. Because of this arrangement, a type of hydraulic remote control of the steering actuator 9 is achieved through the steering element 6.

Specifically, the steering element 6 is connected to the upstream orbitrol 7 via a suitable connecting element, for example, a connecting shaft or a connecting gear. The upstream orbitrol 7 is integrated in a closed hydraulic circuit 11. In addition to the connecting lines 12 and 13, said closed hydraulic circuit comprises a motor 14. On its output side, the motor 14 is connected to the actuator orbitrol 8 via an additional connecting device 15, for example, a shaft or a gear. The movement of the steering element 6 thus drives the adjusting movement of the upstream orbitrol 7. The hydraulic fluid flow triggered and enhanced through the adjustment of the upstream orbitrol 7 in the closed hydraulic circuit 11 ultimately drives motor 14. The connection to the actuator orbitrol 8 occurs on the output side of motor 14, so that overall the adjustment of the upstream orbitrol 7 by the steering element 6 drives an adjustment of the actuator orbitrol 8. The volume flow triggered through the adjustment of the actuator orbitrol 8 ultimately serves the steering adjustment of the steering actuator 9, through which the steering movements of the travel units 2 are driven.

The pumps 16A and 16B are provided for the hydraulic fluid supply of the upstream orbitrol 7 and the actuator orbitrol 8, which may alternatively both be supplied with hydraulic fluid through a common pump as well. The pumps 16A and 16B convey hydraulic fluid from a tank 17 to the upstream orbitrol 7 via the line 18 and to the actuator orbitrol 8 via a line 20. The pumps 16 are driven, for example, through a pump transfer gear or a power take-off of the drive engine and may, but do not necessarily have to, be used exclusively for supplying orbitrols 7 and 8. This is indicated by reference sign 43. Ideally, both pumps are driven through one and the same pump transfer gear or one and the same power take-off. Transfer from the upstream orbitrol to the tank 17 7 occurs via the line 19. The actuator orbitrol 8 is in fluid communication with the tank 17 via the line 20. Pressure relief valves 21 are respectively provided coming from the line 19 to the actuator orbitrol as well as on the output side to line 20. Two drivelines 22 and 23 are provided coming from the actuator orbitrol 8, which are in fluid communication with the steering actuator 9.

Further included in the closed hydraulic circuit 11 is a device 24 for pressure pre-tensioning as well as pressure limitation. It is arranged in line connection between the connecting lines 12 and 13 and comprises check valves 25 and, parallel thereto, pressure relief valves 26. The device 24 for pressure pre-tensioning thus enables, on the one hand, the desired pressure level to be maintained within the closed hydraulic circuit 11 and, on the other hand, serves to prevent excessive load conditions, which, for example, may occur if the operator attempts to further increase the steering angle via the steering element although the steering actuator 9 has reached the maximum steering angle. Due to the enhancing function of the upstream orbitrol 7, the pressure increases in the closed circuit, so that the present pressure protection becomes active. The device 24 for pressure pre-tensioning may be designed as an individual module, as indicated by the dashed box in FIG. 7. Alternatively, the entire pilot stage, comprising the upstream orbitrol 7, the line connections to the pump and to the tank, the device 24, as well as the connection to the actuator orbitrol 8, i.e., the part situated between the steering wheel 6 and actuator orbitrol 8, i.e., the pilot stage itself, may be designed as an individual module.

Furthermore, the unit consisting of the steering element 6 and the upstream orbitrol 7 may likewise form an individual module 27. In addition, as is known, the motor 14 is preferably designed as an individual module, as is the actuator orbitrol 8 (module 28). The individual modules 14, 24, 27, and 28 are connected via the connecting lines already mentioned above, where particularly the components of the connecting lines running between the individual modules, particularly coming from the module 27, may be designed as flexible hydraulic hoses.

A significant effect of the basic arrangement shown in FIG. 7 is especially the gradual enhancement of steering force of the actuating power introduced the via steering element 6 initially through the upstream orbitrol 7 towards the actuator orbitrol 8 and thence towards the steering actuator 9. Thus, it is particularly also possible to compensate or absorb pressure losses at the motor 14 and/or in the connecting lines, particularly lines 12 and 13, so that the steering forces to be applied on the steering wheel ideally only fluctuate very little or ideally even remain the same. As a result, an actuation situation is provided for the steering device 6 that is not affected by pressure losses/resistances in the lines 12 and 13 and/or at the motor 14, which is perceived as extremely comfortable by operators.

Figure 8:
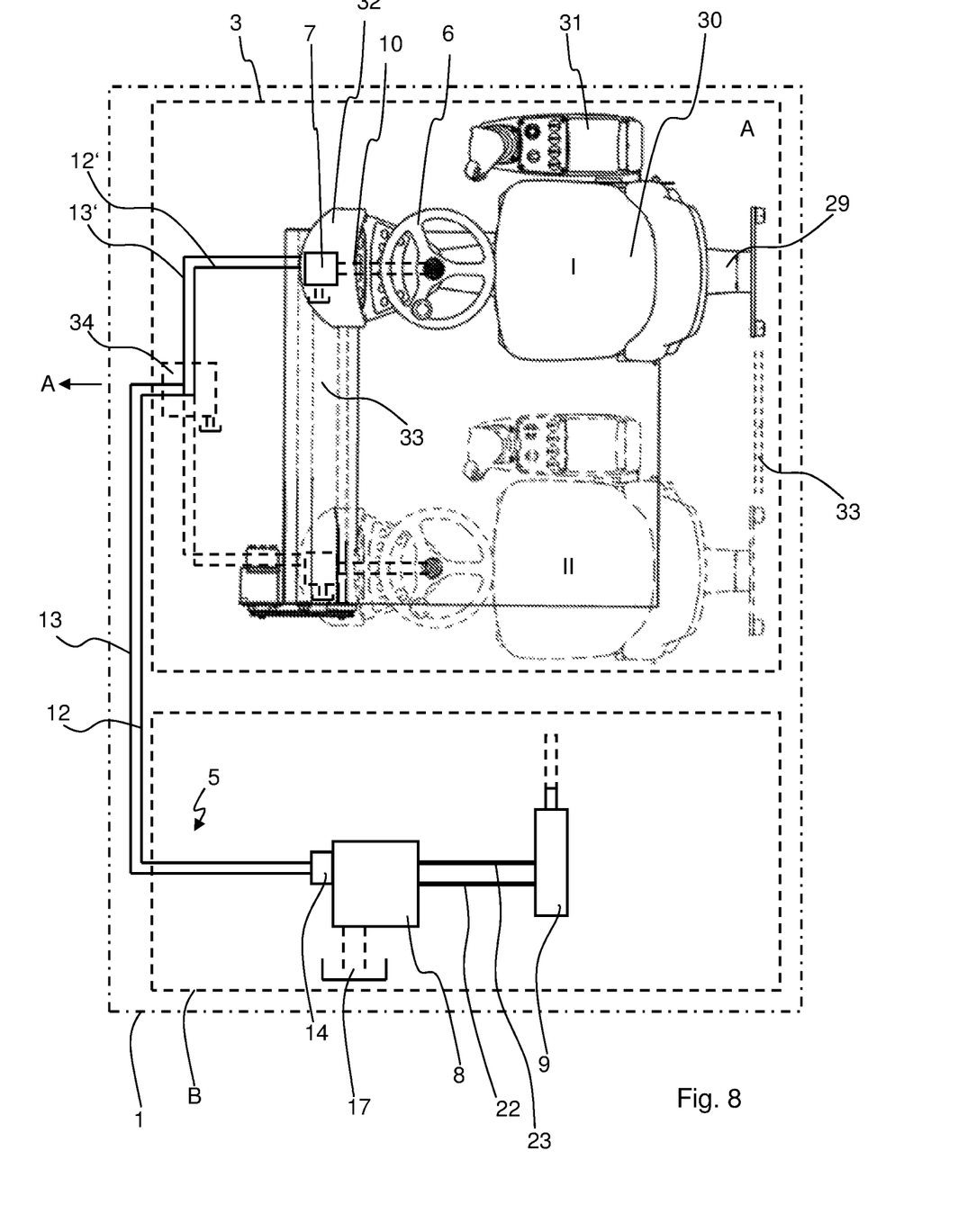
FIG. 8: is a schematic diagram of an adjustable operator platform having the steering device of FIG. 7.

The basic principle shown in FIG. 7 is suitable in particular for integration in an operator platform 3 with an adjustable operating position. In this connection, the dashed line contained in FIG. 7 segments the steering device 5 into an operator platform part A and a machine frame part B. Those elements shown in the area of the operator platform part A are thus arranged within the operator platform or at least on it, particularly on an adjustable component, for example, an adjustable operator workstation, whereas the elements situated in the machine frame part B of FIG. 7 are preferably arranged on the machine frame, in an engine compartment, and/or at least stationary relative to a drive engine of the construction machine 1. FIG. 8 illustrates this in further detail. Reference is made to FIG. 7 with respect to the specific design of the steering device of FIG. 8.

FIG. 8 shows an operator platform 3 with a control slide 29, comprising a driver's seat 30, a control panel 31, the steering element 6, and a control column 32. The control slide 29 including these elements is movable transversely to the direction of work (Ar) via a guide device 33 between two end positions I and II. FIG. 8 shows the control slide 29 as being in position I, while position II is indicated with a dashed line. Instead of the control slide 29, for example, a control platform or the like, that is rotatable about a vertical axis, may be used. The line sections 12' and 13', which are part of the connecting lines 12 and 13 between the upstream orbitrol 7 and the actuator orbitrol 8 are designed as flexible lines, which are connected to the other sections of the connecting lines 12 and 13, which may also in part be stationary pipelines, via a connecting point 34. Viewed transversely to the working direction A, the connecting point 34 is arranged approximately centrally between the two positions I and II. When the aforementioned remote control of the steering actuator 9 occurs starting at the steering element 6, neither an electrical nor a mechanical interface is necessary for transmitting the steering command. No additional adaptation measures are necessary at the steering device 5 to adapt it to the different positions I and II because the flexible line sections 12' and 13' compensate any position changes between the upstream orbitrol 7 and the connecting point 34, respectively the actuator orbitrol 8.

Furthermore, FIG. 8 illustrates an additional benefit of the steering device 5. The upstream orbitrol 7 and the actuator orbitrol 8 each constitute an enhancement stage of the steering force applied via the steering element 6. The hydraulic-mechanical losses in the closed circuit 11 as well as at the motor 14, which, if using a displacement unit without an enhancement function, i.e., particularly a conventional gerotor, would add up directly as an additional actuation force to be applied on the steering element 6 and would be perceived as a disturbance by the operator, can be equalized for the operator through the upstream orbitrol 7. Due to the fact that the necessary input torque is low in the subsequent actuator orbitrol 8, only a fraction of the power which must be transmitted by the power path from the actuator orbitrol 8 to the steering actuator 9 and thence to the steering apparatus 44 must be transmitted in the closed circuit 11 of the upstream orbitrol 7. As a result, with a given hydraulic transmission in the closed circuit 11, a low pressure level and/or a low volume flow emerges ("minimal output"), which in turn enables the use of hydraulic hoses with small nominal diameters (e.g. 6 mm diameter) and/or the use of lower pressure resistances (e.g. hydraulic hoses of the "light series" instead of the "heavy-duty series", as defined in DIN 20066), particularly in the hose sections 12 and 13. In contrast, in the present case, hoses of the heavy-duty series (DIN 20066) are preferably used in the "power path" (lines 22 and 23 between the actuator orbitrol 8 and the steering actuator 9), e.g. with a nominal diameter of 12 mm. Due to the additional enhancement occurring through the actuator orbitrol 8, however, the hydraulic hoses having larger nominal diameters, which are to be used for connecting lines 20 and 23 to the steering actuator 9, can be kept comparatively short, which is also due to the spatial separation of the two orbitrols 7 and 8, which enables the actuator orbitrol 8 to be arranged in physical proximity to the steering actuator 9 and, thus, short distances with a high power transmission. This is also a significant advantage particularly with respect to costs.

Figure 9:
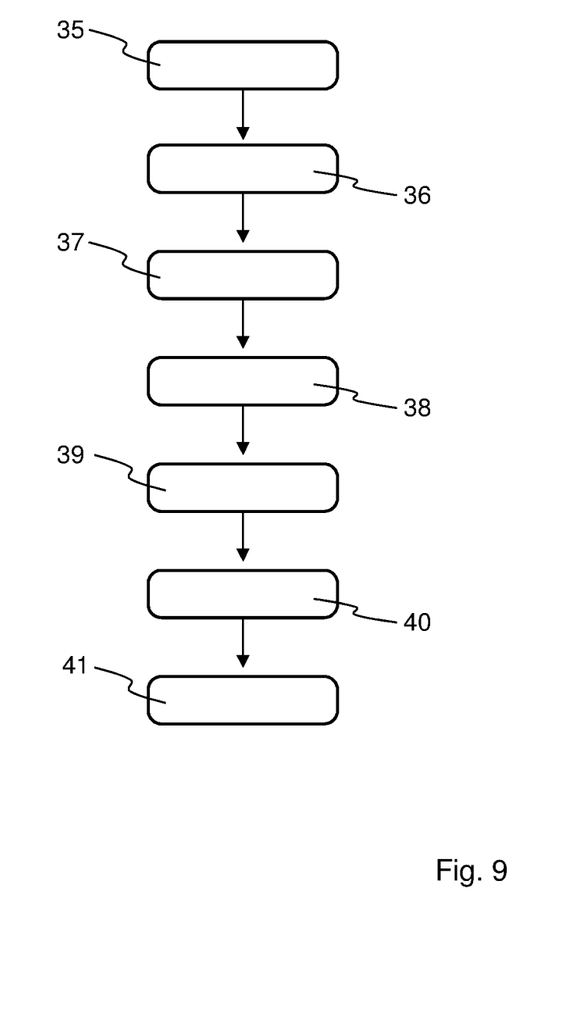
FIG. 9: is a flow chart of a method according to the invention.

Finally, FIG. 10 summarizes the essential steps of the method according to the invention. Initially a manual input of a steering command in step 35 causes driving 36 of an adjusting movement of the upstream orbitrol 7. This enables an enhancement 37 of the actuating force entered via the steering element 6. The enhanced actuating force is then transferred 38 via a hydrostat or closed hydraulic circuit for driving 39 the actuator orbitrol 8. Due to the adjustment of the actuator orbitrol achieved thereby, the actuating force is once again enhanced on the output side of the actuator orbitrol in step 40. Using the hydraulic flow thus obtained, finally, the actuating movement of the steering actuator 9 is driven 41. Thus, overall, this method provides for a two-stage, successive actuating force enhancement, although additional enhancement stages may be included here and are covered by the invention.

What is claimed is:

1. A steering device for a steerable machine, comprising:
    a steering element for manual input of steering commands;
    a steering actuator for driving a steering adjustment of a steering apparatus of a travel unit of the steerable machine;
    a transmission device arranged between the steering element and the steering actuator, the transmission device including an actuator orbitrol for driving the steering actuator;
    wherein an upstream orbitrol is arranged between the steering element and the actuator orbitrol such that the upstream orbitrol is driven by the steering element and the upstream orbitrol drives the actuator orbitrol;
    wherein the upstream orbitrol is operatively connected with the actuator orbitrol via a closed hydraulic circuit; and
    wherein hydraulic connecting lines from the actuator orbitrol to the steering actuator have nominal diameters which are larger than nominal diameters of hydraulic connecting lines in the closed hydraulic circuit by at least a factor of 1.5.

2. The steering device according to claim 1, wherein a hydraulic motor, which is connected to the upstream orbitrol via hydraulic connecting lines and which has a movement transmission device on an output side towards the actuator orbitrol, is provided for driving the actuator orbitrol through the upstream orbitrol.

3. The steering device according to claim 1, wherein a device for pressure pre-tensioning is provided in the closed hydraulic circuit.

4. The steering device according to claim 3, wherein hydraulic fluid is supplied to the device for pressure pre-tensioning via a pump.

5. The steering device according to claim 1, wherein the upstream orbitrol and the actuator orbitrol are supplied via separate pumps or via a common pump.

6. The steering device according to claim 1, wherein the upstream orbitrol forms an interrelated constructional unit with the steering element.

7. The steering device according to claim 1, wherein the steerable machine is a road construction machine and the steering device is disposed on the road construction machine.

8. The steering device according to claim 7, wherein the road construction machine includes an operator platform which is at least partly adjustable between two alternative operating positions, and comprising at least one of the following features:
    at least the steering element of the steering device is adjustable, transversely to a working direction of the construction machine;
    at least the steering element of the steering device is swivelable about a vertical axis;
    at least the steering element of the steering device is part of a control platform or a control slide, wherein the control platform or the control slide is swivelable transversely to the working direction of the construction machine and/or about a vertical axis.

9. The steering device according to claim 8, wherein the upstream orbitrol is integrated in the control platform or the control slide and carried along with the control platform or the control slide during an adjustment.

10. The steering device according to claim 8, wherein the actuator orbitrol is arranged outside the operator platform.

11. The construction machine according to claim 7, wherein a steering pump of the upstream orbitrol and/or the actuator orbitrol is driven via a pump transfer gear or a power take-off of a drive engine of the road construction machine.

12. A steering device for a steerable machine, comprising:
    a steering element for manual input of steering commands;

a steering actuator for driving a steering adjustment of a steering apparatus of a travel unit of the steerable machine;

a transmission device arranged between the steering element and the steering actuator, the transmission device including an actuator orbitrol for driving the steering actuator;

wherein an upstream orbitrol is arranged between the steering element and the actuator orbitrol such that the upstream orbitrol is driven by the steering element and the upstream orbitrol drives the actuator orbitrol;

wherein the upstream orbitrol is operatively connected with the actuator orbitrol via a closed hydraulic circuit; and wherein a device for pressure pre-tensioning is provided in the closed hydraulic circuit.

13. The steering device according to claim 12, wherein a hydraulic motor, which is connected to the upstream orbitrol via hydraulic connecting lines and which has a movement transmission device on an output side towards the actuator orbitrol, is provided for driving the actuator orbitrol through the upstream orbitrol.

14. The steering device according to claim 12, wherein hydraulic fluid is supplied to the device for pressure pre-tensioning via a pump.

15. The steering device according to claim 12, wherein the upstream orbitrol and the actuator orbitrol are supplied via separate pumps or via a common pump.

16. The steering device according to claim 12, wherein the upstream orbitrol forms an interrelated constructional unit with the steering element.

17. The steering device according to claim 12, wherein the steerable machine is a road construction machine and the steering device is disposed on the road construction machine.

18. The steering device according to claim 17, wherein the road construction machine includes an operator platform which is at least partly adjustable between two alternative operating positions, and comprising at least one of the following features:
- at least the steering element of the steering device is adjustable, transversely to a working direction of the construction machine;
- at least the steering element of the steering device is swivelable about a vertical axis;
- at least the steering element of the steering device is part of a control platform or a control slide, wherein the control platform or the control slide is swivelable transversely to the working direction of the construction machine and/or about a vertical axis.

19. The steering device according to claim 18, wherein the upstream orbitrol is integrated in the control platform or the control slide and carried along with the control platform or the control slide during an adjustment.

20. The steering device according to claim 18, wherein the actuator orbitrol is arranged outside the operator platform.

21. The construction machine according to claim 17, wherein a steering pump of the upstream orbitrol and/or the actuator orbitrol is driven via a pump transfer gear or a power take-off of a drive engine of the road construction machine.

* * * * *